United States Patent [19]
Prestridge

[11] 3,847,775
[45] Nov. 12, 1974

[54] PROCESS FOR ELECTRICAL COALESCING OF WATER

[75] Inventor: Floyd L. Prestridge, Tulsa, Okla. 74101

[73] Assignee: Combustion Engineering, Inc., New York, N.Y.

[22] Filed: Feb. 20, 1973

[21] Appl. No.: 333,903

Related U.S. Application Data

[62] Division of Ser. No. 197,400, Nov. 10, 1971, Pat. No. 3,772,180.

[52] U.S. Cl. ............................... 204/191, 204/305
[51] Int. Cl. .......................... B01d 13/02, B03c 5/02
[58] Field of Search ............ 204/191, 305, 302–308, 204/186–191

[56] References Cited
UNITED STATES PATENTS

| 1,570,209 | 1/1926 | DeBrey | 204/191 |
| 1,934,923 | 11/1933 | Heinrich | 204/191 |
| 2,101,168 | 12/1937 | Deutsch | 204/191 |
| 2,029,362 | 2/1936 | Dillon | 204/191 |

Primary Examiner—T. M. Tufariello
Attorney, Agent, or Firm—Arthur L. Wade

[57] ABSTRACT

The essential elements of the electrical system of a treater, or dehydrator, of produced oil well fluids are connected and physically oriented as mounted within the shell of the treater. The flow of the fluids is indicated in relation to the elements for coalescence of the water droplets to cause their subsequent gravitation and collection into a body of water below the electrodes. The electrodes are disclosed in planar form and shown as energized periodically by voltage to generate electrostatic fields in which the water droplets coalesce.

5 Claims, 5 Drawing Figures

PROCESS FOR ELECTRICAL COALESCING OF WATER

This application is a division of Ser. No. 197,400, filed Nov. 10, 1971 now U.S. Pat. No. 3,772,180.

BACKGROUND OF THE INVENTION

1. Field of the Invention

The present invention relates to the generation of a plurality of electrostatic fields through which a mixture of water and oil is flowed for sequential exposure to the fields as forces for coalescing droplets of the water into sizes great enough for their effective gravitation from the oil. More particularly, the invention relates to applying a form of d.c. voltage to an electrode system suspended in the mixture to generate the plurality of fields which will first function as a field generated by a.c. voltage and secondly as a field generated by d.c. voltage which will cause an ordered migration of dispersed water droplets relative to the electrodes.

2. Description of the Prior Art

The expanded synopsis of the paper titled "Theoretical Basis of Operation of Apparatus for Electric Dehydration and Electric Desalting of Oil Emulsions" by G. M. Panchenkov, L. K. Tsabek and V. Papko submitted at the VIII World Petroleum Congress in Moscow makes a state of the art declaration which has apparent validity.

"The world publications—both journals and patents—comprise a vast amount of various suggestions for design of electric dehydrators, frequency, geometry and intensity of electric fields. But in most cases the offered designs have no scientific—theoretical base."

Otherwise, the synopsis is a broad, somewhat confusing, reference to the paper. The impression remains that a scientific-theoretical basis may have been formulated, but practical suggestions and explanations are lacking in this work.

When it comes to locating simple, comprehensive, satisfactory explanations of how coalescence is brought about in electrostatic fields, the literature is quite broad and indefinite. The phenomenon seems to be more often simply observed rather than comprehensively explained.

F. G. Cottrell is generally credited with the first practical application of electrostatic fields to dehydration (treatment) of crude oil emulsions. His pioneer U.S. Pat. No. 987,115 (1911) claimed the water particles "are subject to electrostatic forces dependent upon the relative potentials and dielectric constants of the materials in contact and caused to coalesce into masses" easily removed by settling or centrifuging.

Cottrell set the pattern for explanation of the relation between coalescence and emulsions. Most subsequent explanations remained about as vague. C. G. Sumner's 5th Edition of Clayton's "The Theory of Emulsions and Their Technical Treatment," Chemical Publishing Co., Inc., 212 Fifth Avenue, New York, 1954, stated at page 583:

"The theory underlying the Cottrell process and its modifications is that the emulsion serves as a multitude of electrical condensers, the electrodes or poles being the water globules and the continuous oil phase serving as the dielectric. Under the influence of a high-potential alternating field the charged water particles rupture the enveloping oil films and coalesce, forming larger drops."

Subsequent cinematographic observation gave enough backing to this explanation to keep it from serious challenge—and probably much additional investigation. In all events, subsequent workers in this field usually employed large a.c. voltages, giving little or no practical attention to the use of d.c. voltage. This type of limited, parochial, views of a phenomenon in oil field technology is not uncommon.

The configuration of two electrodes within an emulsion, one electrode being grounded, has long been assumed to generate a sufficiently effective electrostatic field with a.c. voltage applied to the ungrounded electrode. Undeniably, the force generated by this field will resolve emulsions; however, this force appears inefficient.

The literature listed in Chapter 9 — Demulsification — of Emulsions: Theory and Practice, 2nd Edition by Paul Becker, Van Nostrand — Reinhold Books, New York, is impressive. However, it now appears, in accordance with the expanded synopsis of the Russian paper, the workers in the art have only searched empirically for improvement with various electrode-grid shapes, horizontal and vertical arrangements for the electrode-grids and various voltage levels. The result obtained by the electrostatic fields established by a.c. voltage upon water particles suspended in oil charging, or polarizing, the water droplets under the Cottrell theory, appears to be both random and inefficient. It has now been discovered that an electrostatic field generated between electrodes to which d.c. voltage is periodically applied brings about a surprising result. The water droplets in the field migrate back and forth between the electrodes in a well-ordered pattern, growing larger and gravitating to collect below the electrodes in a body.

The work of Siebert and Brady with direct current is evidenced by U.S. Pat. No. 1,290,369 (1919). However, d.c. voltage applied periodically to electrodes brings about an ordered migration of dispersed water droplets which has surprisingly enhanced their coalescence in contrast to the results of applying a.c. voltage solely under the Cottrell theory. Specifically, voltage applied periodically to a pair of electrodes suspended above a grounded water-emulsion interface generates a series of electrostatic fields. The field generated between each electrode and the interface is quite different from the field generated between the electrodes. The oil-water mixture can be moved sequentially through these different fields and become thoroughly dehydrated by the effective coalescence of the water droplets and their consequent gravitation.

The theory on which the present invention is founded includes a specific concept of the structure of a molecule of water as a constituent of a droplet of water. It is a generally accepted fact that individual molecules within a water droplet have a slight electrical dipole, i.e., the negative and positive charges are not concentric. Despite the existence of the molecule dipoles, their droplets are neutral.

The present concept includes the usual droplet of water in situ as containing ions, or even free electrons. When this droplet is placed within the unidirectional electrostatic field between two electrodes to which d.c. voltage is applied, the dipoles are accentuated and aligned with the field. The alignment is followed by physical movement, or migration, toward the near electrode.

In theory, the water droplet will physically move to the near electrode and remain there. However, it has been observed that as these droplets approach the electrode, they are suddenly repelled and migrate toward the opposite electrode where the attraction-repulsion pattern is repeated. The end result is a zig-zag downward course for these droplets during which they are directed to collide with other droplets, causing their progressive coalescence.

A first explanation of initial attraction, and subsequent repulsion, between droplets and electrodes, relies upon the presence of the ions and free electrons in each droplet. As the water molecules align to form a stronger dipole, the droplet is attracted to the near electrode, and the dipole moment becomes increasingly strong. It is now that the negative ions and electrons are attracted to the positive end of the dipole and the positive ions to the negative end. These ions and electrons at one end of the dipole form a shielding charge on the surface of the droplet with the same polarity as the near electrode. This charge on each end shields the dipole charge of that end and the droplet is consequently repelled toward the opposite electrode.

The attraction, followed by repulsion, of the water particles, or droplets, form an orderly migration from electrode to electrode. Not all droplets go the same direction at the same time, and directed collisions occur. With the collisions between droplets occurring at the time when opposite charges of their dipole face each other, the droplets are attracted to each other by their unlike charges into combining, or coalescing.

A second explanation of initial attraction, and subsequent repulsion between droplets and electrodes, also relies upon the presence of the ions and free electrons in each droplet. Because of the electrical dipole, the water droplets are orientated and begin to drift because of proximity to an electrode of a particular potential and polarity. The strength of the electrostatic field on the dipole, because of the charge on the nearest electrode, increases so rapidly, relative to the droplet's ability to accelerate, that electrons are either added to or stripped from the droplet. This change of electron inventory results in the droplet developing the same charge as the nearest electrode and, accordingly, being repelled.

This explanation accounts for the initial motion of the water droplets toward an electrode and their subsequent repulsion therefrom. Further, following this second explanation, the water droplets approaching one another would now be oppositely charged and have strong attractive forces between them which directs collision and coalescence.

The Applicant has considered both explanations of the movement of water droplets in the unidirectional field. Neither explanation is favored and the validity of the claims to the invention does not depend upon a choice between the explanations.

Under either of the foregoing explanations, or one yet to be developed, the results of the invention are evident in the actual reduction to practice of the invention. A unidirectional field contributes to the results. In establishing the unidirectional field, certain guidelines should be understood.

The d.c. voltage is applied periodically to its electrodes. Within this generalization, it is understood that the d.c. voltage may be generated by rectifying a.c. voltage, either half or full wave. Each of the half cycles of voltage is considered a pulse of voltage. A group of these half cycles, applied at intervals, also constitutes a pulse. Further, any form of d.c. voltage applied to the electrodes at intervals through a form of switch, mechanical or electrical, is within the scope of the definition of pulsating. The broad guideline is that the voltage applied to electrodes to establish the unidirectional electrostatic field between them is applied periodically, at intervals or in pulsations.

SUMMARY OF THE INVENTION

The present invention contemplates applying d.c. voltage periodically to at least one pair of electrodes to form a pulsating unidirectional electrostatic field through which droplets of water dispersed throughout a second liquid are passed and coalesced.

The invention more specifically contemplates applying d.c. voltage periodically to an electrode system including at least two electrodes and the upper surface of a body of water below the electrodes as a grounded electrode through which a mixture of water and a second liquid is flowed. The electrostatic fields generated by applying the periodic pulses of d.c. voltage will first rupture the oil film enveloping the water droplets as is traditionally brought about by a.c. fields. Subsequently, the remaining water droplets will have an ordered migration which will result in directed collision of the droplets which will bring about effective coalescence of these droplets.

The invention more specifically contemplates the electrodes connected to a rectifier system in the output of a source of a.c. voltage, the rectifier system being as elemental as a single rectifier in the connection between the a.c. source and one of the electrodes. The resulting electrostatic fields between the two electrodes and water surface produce the desired coalescence of water droplets.

The invention more specifically contemplates the electrodes connected to a rectifier system in the output of a source of a.c. voltage in an arrangement which will produce a potential between the electrodes greater than the a.c. voltage source. Therefore, the relatively high strength of the resulting electrostatic fields, and their large coalescing capacity, will be sustained by application of an a.c. voltage of relatively low magnitude.

The invention more specifically contemplates the connection of the two electrodes to an a.c. energized transformer, one end of the transformer secondary being connected to ground and the other connected to the electrodes through oppositely poled rectifier elements. Through this connection, d.c. voltage of opposite polarity is alternately applied from the transformer secondary to the electrodes. On each half cycle of the a.c. voltage source, voltage is applied to one electrode while the other electrode has no voltage applied to it. The voltage between the electrodes is greater than the RMS and peak voltage of the secondary. The result is a unique form of electrostatic fields contemplated by the invention, the field between the electrodes pulsating and adjusting in magnitude in dependence upon the conductivity of the liquid mixture between the electrodes.

EMULSION-MIXTURE-DISPERSION

In the drawing disclosure, and its description, all reference to emulsion, mixtures of oil and water, and water droplets dispersed in a second liquid is to basically the same material. Breaking the bond between oil and water, and subsequent removal of water, is dehydration of the oil. This reduction of water content of mixtures is the name of the game, the ultimate objective of the invention.

"WET" vs. "DRY"

When referring to emulsions, mixtures or dispersions of water in oil, the terms "wet" and "dry" are sometimes used. These are relative terms which I wish to define more specifically for use in disclosing the invention.

The water in emulsions, mixtures or dispersions serves no useful purpose. As a matter of fact, water is costly to transport and is the cause of corrosion in the equipment of the system. Therefore, it is desirable to reduce the water content of produced oil to as low a percent as possible before transporting the oil to a refinery. Many customers for produced oil carefully specify the maximum percent of water they will accept.

It is theoretically possible to process all water from the system. Generally, it is practical to reduce the water content of produced oil to a fraction of a percent or even to a trace. Therefore, oil containing only 1 percent or less water will herein be termed "dry."

On the other hand, any water above one percent in emulsion will be herein termed "wet." However, the percentage of water in an emulsified condition is seldom greater than 10% of the total mixture of oil and water.

In this disclosure, the term "wet" emulsion will apply to oil and water mixtures in which the dispersed water is greater than one percent. "Dry" emulsion will have less water.

Other objects, advantages and features of this invention will become apparent to one skilled in the art upon consideration of the written specification, appended claims, and attached drawings, wherein;

FIG. 1

Figure 1:
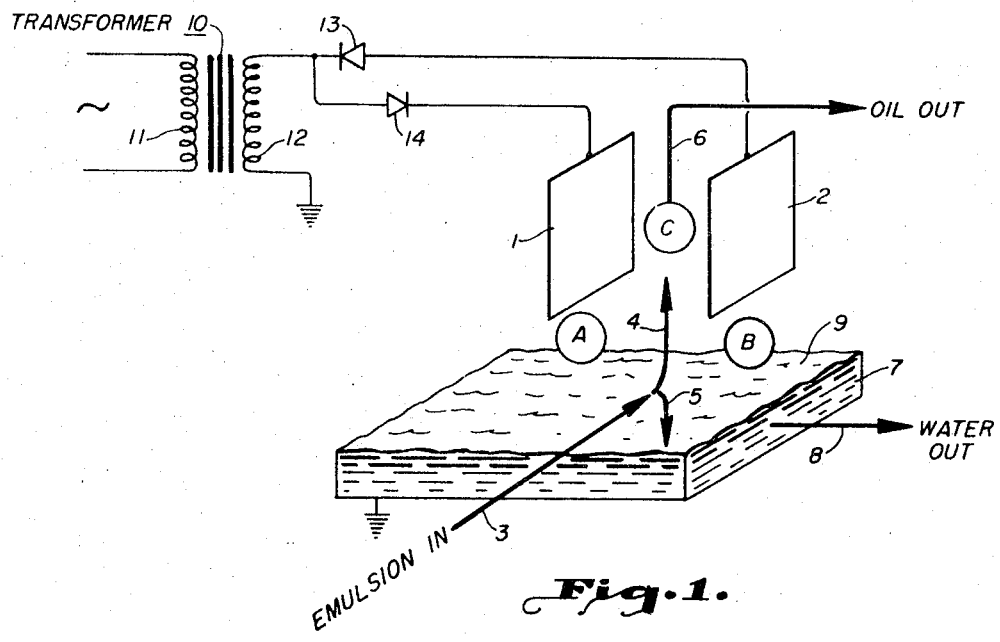
FIG. 1 is a somewhat diagrammatic, partial perspective, view of a portion of the flow pattern of production fluids through the shell of a dehydrating vessel and the electrical system in which the invention is embodied.

Before specifically disclosing the structure of FIG. 1 in which the present invention is embodied, consideration of selected background references will be helpful. U.S. Pat. No. 3,207,686, issued Sept. 21, 1965 to H. R. Jarvis, et al., discloses the typical container 10 of electric treaters which is in the general form of a cylinder horizontally extended. The last compartment within this cylinder, through which fluids flow, is chamber 24. Within chamber 24, electrodes 80 and 81 are mounted, 81 being connected to high voltage transformer 90.

The incoming liquids are distributed by structures 58, along the bottom of compartment 24. The oil and water form an interface 70 above the distributors and below the electrodes.

The disclosure of Canadian Pat. No. 849,307, issued Aug. 18, 1970, to R. L. Pettefer, also features an electric treater with vessel 10 through which an oil well stream is produced. Treating compartment 30 is the last chamber within shell 10 and a part of the flow path.

The water body 36 has an interface disclosed with the oil-water mixture, but all liquids are not distributed with structure as disclosed in the Jarvis, et al., patent. However, electrode pairs 32,33 and 34,35 are mounted above the interface and connected to transformer 31.

The primary reason for bringing attention to the disclosure of the Pettefer patent is the fact that the electrodes are thereby disclosed as extending vertically within compartment 30. Both disclosures illustrate the general thermal conditioning of the liquids prior to their flowing through the electrostatic fields generated by the electrodes energized by transformers. In all events, water coalesced and gravitated forms a body of water below the electrodes, the surface of which body may itself be regarded as an electrode at ground potential.

In presenting FIG. 1 of the present disclosure, illustration of conventional components of the electric treater have not been made because their form and function can be readily understood from the disclosure of the patents supra. It is even believed, in this particular situation, the details would tend to hamper a good perspective of the invention.

FIG. 1, therefore, has been developed by a somewhat diagrammatic representation of structure in which the invention is embodied. Complete understanding of the invention may not be gained by everyone, but FIG. 1 is an adequate beginning for disclosing an overview of the invention.

Electrodes 1 and 2 are shown, arranged vertically and parallel to each other and to the flow of fluids, within the treater shell. The emulsion of the well stream is directed toward the electrodes along path 3 which is generally lower than the electrodes. The flow of the emulsion from path 3 is then directed upward along path 4. Any water droplets that coalesce to a size large enough to gravitate from the emulsion travel downward along path 5. After this treatment by exposure to the electrostatic fields generated by the invention, the oil of the emulsion continues upward along path 6 for delivery as the finished product of the process.

The water which is separated from the emulsion flowing along path 5, collects in a lower body 7. A controlled discharge of water from this body 7 is indicated as along path 8. The control of discharged water is exerted to maintain its upper surface 9 a predetermined distance below the electrodes.

The relative spatial relationship between the electrodes and the upper water surface now established, it can be generally appreciated that the electrostatic fields are located between the lower edges of the electrodes and the grounded surface of the water and between the electrodes. Field (A) and field (B) are beneath the electrodes and form an overlapping pattern of their lines of force between and beneath the electrodes. Due to the nature of the d.c. voltage applied, the overlapping fields midway between and beneath the electrodes will produce a field having the characteristics of a field similar to one generated by a.c. voltage.

The field (C), between the electrodes, is simply generated by d.c. voltage and behaves as such. However, the nature of the d.c. voltage applied gives this field (C) certain desirable characteristics.

The d.c. voltage applied to the electrodes is generated in pulses. When these pulses are applied to the two-electrode, water-surface system, the multiple electrostatic fields (A), (B) and (C) are established.

A generalized showing of a d.c. voltage source could be disclosed. The traditional "black box" could be used to represent a battery, a generator or a rectified transformer output. However, transformer 10 is presently the more practical form for a basic source of potential. Primary winding 11 is energized by an a.c. voltage and secondary winding 12 has its cyclical output rectified for application to electrodes 1 and 2.

The specific connection between secondary winding 12 and electrodes 1 and 2 produces the desired electrostatic fields. Through this connection, pulsating d.c. voltage is applied to the electrodes.

The secondary 12 is connected at one end to ground. The second end of the secondary is connected to the electrodes 1,2 in parallel, rectifier 13 is one branch and rectifier 14 is the other branch. The rectifiers are oppositely poled. Through this arrangement, a voltage pulse is applied alternately to the electrodes and of opposite polarity to one another. The result is a pulsating d.c. voltage applied to the electrodes and the magnitude of this voltage between electrodes 1 and 2 is greater than both the RMS and peak voltage input from the secondary of the transformer.

COMPOSITE FIELDS

FIG. 1 discloses structure in which the invention is embodied, establishing a plurality of electrostatic field with which water droplets in an emulsion are coalesced until they are large enough to gravitate and form a lower collection. Surprising success has been obtained in dehydrating oil field emulsions by passing them through the composite of fields (A) and (B) and then passing the emulsions through (C). A careful study of the results has been made and both general and specific conclusions about how these results are obtained have been drawn. Although not absolutely certain of the precision of the formulated theories, they are based on systematic research of the problem, and solution, and represent the best thinking on the matter at present.

It has been observed that coalescence of the water droplets of a wet emulsion is most effective under the force of an electrostatic field which is generated by voltage of comparatively low magnitude which has both directional and magnitude change. In contrast, a dry emulsion is more effectively treated by an electrostatic field generated by a steady-state voltage of comparatively high magnitude. Between the two extremes of emulsion condition, it is desired to have fields applied which vary from having an alternating characteristic to having a unidirectional characteristic.

The present invention provides a structural arrangement which progressively subjects an emulsion to electrostatic fields ranging from the alternating type to the unidirectional type. As the wet emulsion travels through an alternating type of field, it has its water content reduced. When the emulsion is dry, it is then passed through a unidirectional type of field for final dehydration. Electrostatic fields of both types are provided with the disclosed embodiment of the invention in FIG. 1.

Figures 2A, 2B:
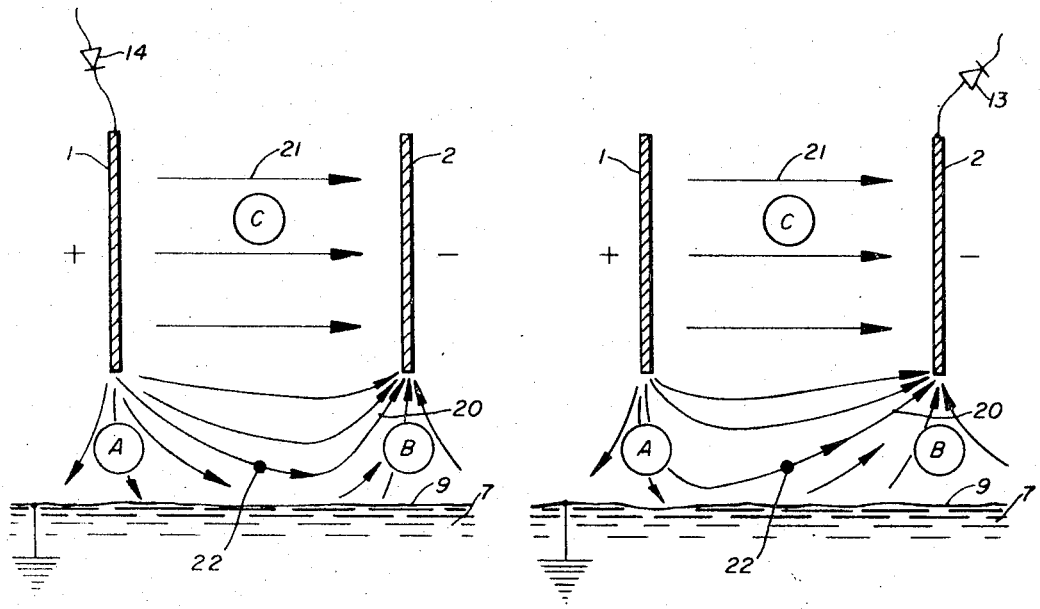
FIGS. 2a and 2b are diagrammatic side views of the electrodes of FIG. 1 and lines of force illustrating the electrostatic fields generated by the invention.

FIGS. 2a and 2b

Referring to FIGS. 2a and 2b, the electrodes 1 and 2 of FIG. 1 are disclosed from another angle of view. They are oriented in an elevation which lends itself to diagrammatic representation of the electrostatic fields generated by energizing the electrodes. Specifically, each electrode is viewed from its end, above water body 7 with its upper surface 9 interfacing with the emulsion flowing from path 3.

The electrostatic field, or fields, created between electrodes 1 and 2, and between the electrodes and water 7, are represented in FIGS. 2a and 2b by lines of force 20 and 21. Lines 20 occur in the region below electrodes 1 and 2 and lines 21 occur in the region between the electrodes.

Referring specifically to FIG. 2a, when diode 14 conducts, a plus (+) charge is developing on electrode 1, and at its peak this charge generates a field having lines of force 20. It is assumed that electrode 2 had previously acquired a comparable negative (−) charge and that a portion of it had leaked off due to leakage conduction in wet emulsion.

Referring specifically to FIG. 2b, when diode 13 conducts, a negative (−) charge is developing on electrode 2 and at its peak this charge generates a field having lines of force 20. It is assumed that electrode 1 had previously acquired a comparable positive (+) and that a portion of it had leaked off due to leakage conduction in wet emulsions.

Consider the lines of force 20 in each of FIGS. 2a and 2b with respect to their direction. A water droplet 22 is represented in FIG. 2a as having a line of force 20 directed generally downward upon the droplet. In FIG. 2b the line of force 20 is directed upon the same droplet but in a generally upward direction.

An area below the electrodes could be depicted, or outlined, as the one in which the directional variation of lines of force 20 is the greatest. However, disclosure, in this detail, of the function of the electrostatic field does not appear warranted. It is sufficient to point out that water droplets, as represented by 22, in the region below electrodes 1 and 2 will have electrostatic forces placed upon them which vary in direction to some extent with the alternate pulsing of the electrodes.

It should be again emphasized that FIGS. 2a and 2b are not representative of a system in which the emulsion is so wet that a reversal of potential occurs at the electrode not being pulsed. In such emulsions, the direction of electrostatic forces on the water droplets will change nearly 180°. Additionally, FIGS. 2a and 2b do not illustrate the fact that the magnitude of the electrostatic forces at any given location below the electrodes may vary considerably between voltage pulse peaks. The variations in magnitude are greater, the more wet the emulsion.

AUTOMATIC ADJUSTMENT OF ALTERNATING FIELD STRENGTH

FIGS. 2a and 2b also help in understanding another feature of the electrostatic field generated beneath the electrodes. This feature is one of automatic adjustment relative to the more tightly emulsified oil-water which tends to collect in a layer at the interface 9.

As water droplets gravitate downward, they are expected to simply become part of body 7. However, stratification within the emulsion does develop. A gradient of the water concentration right down to the interface 9 forms.

The layer at the interface is very conductive because of its high concentration of water content. Further, the layer tends to deepen, i.e., rise toward the lower edge of the electrodes. As this conductive layer thickens, moves upward, it causes the gradient of the field to increase. The shortened distance between the layer, effectively the ground electrode, increases the strength of the electrostatic field between the layer and the electrode above. The result is additional energy directed into the tight emulsion. Additional energy into the emulsion increases coalescence of the water droplets. This heightened "treating" reduces the tendency of the layer to grow. Therefore, automatic adjustment of this field strength is gained when required. This feature is a welcome addition to the basic function of the invention.

AUTOMATIC ADJUSTMENT OF UNIDIRECTIONAL FIELD: FIG. 3

An additional, automatic, adjustment of the fields is provided through the particular characteristics of the field between the electrodes. First, it is well known that when the emulsions passed between electrodes of electric treaters are very wet, they form a highly conductive path for the high voltage on the electrodes. Arcing readily takes place over this conductive path. To reduce this effect, it is desirable to control the voltage level on the electrodes during the period when very wet emulsions are passing between the electrodes.

Figure 3:
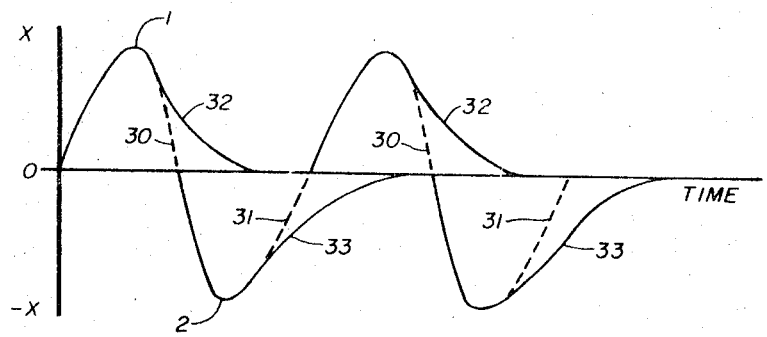
FIG. 3 is a graph of the voltages generated between the electrodes by the invention.

The application of pulsating d.c. voltage to electrodes provides automatic adjustment of the potential between electrodes with wet emulsions between the electrodes. FIG. 3 is established to disclose how this regulation automatically takes place. As the emulsion becomes more wet, the potential between electrodes reduces. An electrostatic field of maximum permissible strength remains, continuing to treat, but the voltage magnitude has been reduced and the corresponding tendency to arc between electrodes has reduced. As the emulsion becomes more dry, the voltage between electrodes increases, approaching substantially twice the value of the RMS value of the applied voltage.

With conductive water droplets dispersed in the liquid mixture between the electrodes, the voltage applied to the electrodes leaks off at a rate depending upon the degree of conductivity of the emulsion. In FIG. 3, the variation of voltage on the electrodes is indicated. The applied voltage across secondary 12 is, of course, a.c. in form and need not be illustrated.

The rectifiers 13,14 control the application of the a.c. voltage to electrodes 1,2. FIG. 3 illustrates the development of this voltage on the electrodes.

FIG. 3 assumes the emulsion between electrodes 1,2 is fairly wet. Therefore, the charge, or voltage pulse, leaks off fairly rapidly. If there were instantaneous leak-off, the voltage on electrode 1 would decrease along dotted lines 30 and the voltage pulse on electrode 2 would decrease along dotted lines 31. However, the emulsion is assumed to not be conductive to that degree and the voltage follows lines 32 on electrode 1 and along lines 33 on electrode 2.

Under the depicted pattern of voltage, the strength of the field (C) is directly proportional to the average value of the potential between 1 and 2. As discussed previously, a somewhat drier emulsion would prevent more leak-off of the applied voltage pulses and, therefore, generate a stronger field. Therefore, the invention provides a unidirectional field which adjusts in magnitude to militate against arcing between electrodes with wet emulsions. Then, with dry emulsion, the field increases in strength, increasing its treating capacity.

At this point, we can make a restatement concerning the invention. The invention provides a series of fields for treating. The relatively weak alternating field for the wetter emulsions and the unidirectional field for the drier emulsions. In addition, the unidirectional field is self-regulating in strength to avoid arcing but to provide enough strength for continued treating.

MECHANICAL VARIATION OF THE FIG. 1 EMBODIMENT

Figure 4:
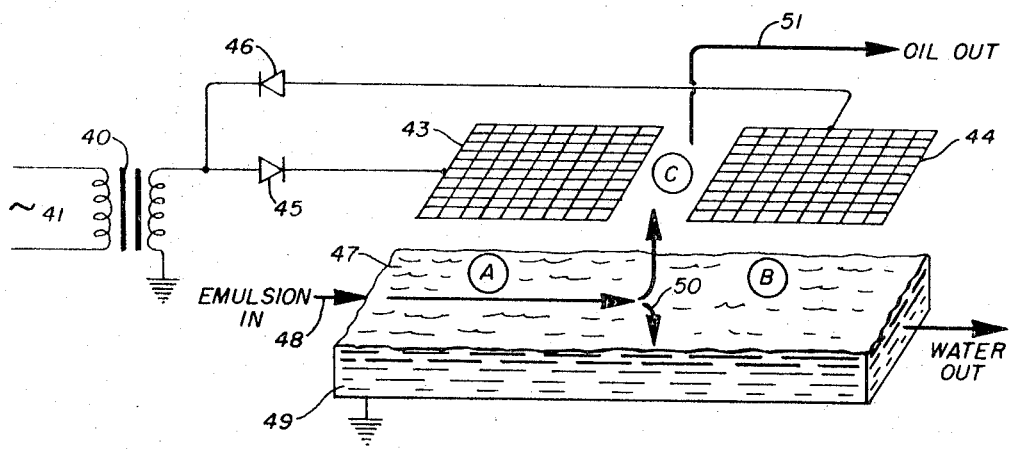
FIG. 4 is a view similar to FIG. 1 but with the electrodes oriented horizontally.

The scope of the invention must not be obscured by the physical limitations of its embodiment in FIG. 1. Although the electrodes of planar form may cost conveniently be extended vertically, and in parallel, the invention would also be embodied in a system including the electrodes oriented in a horizontal plane. FIG. 4 is designed to disclose this modified embodiment.

Transformer 40 has its primary 41 energized by an a.c. voltage. One end of the secondary 42 is grounded while the other end is connected to electrodes 43,44. The connection between the secondary 42 and the electrodes is controlled by rectifiers 45,46 which are arranged oppositely poled in their respective branches of the connection.

The electrodes 43,44 are oriented in a common horizontal plane, spaced from the interface 47. Interface 47 is between the emulsion flowing into the system along path 48 and body of water 49. The emulsion flows into, and through, the electrostatic fields generated by the voltages between the electrodes and the electrodes and interface 47. The water coalesced and gravitated from the emulsion joins water body 49, descending along path 50. The oil, freed of water, ascends along path 51.

As with the embodiment of FIG. 1, both alternating and unidirectional fields are generated in FIG. 4. The fields of FIG. 1 and those of FIG. 4 may be dissimilar in size and shape, but they are generated and applied to the emulsion with the same results.

Fields (A) and (B), in effect, create a composite, alternating field below and between each electrode and interface 47. This field is generated by the oppositely poled rectifiers 45,46, alternately applying voltage pulses to the electrodes. In comparison, the voltage between the electrodes establishes unidirectional field (C).

These fields (A), (B) and (C) are similar in characteristics to those of FIG. 1 and function the same. The results are the same because both embody the same invention. No mechanical variation, or orientation, of the electrodes should obscure the scope of the invention.

Exploration of the physical, or mechanical, variation of electrode relationships includes the use of an electrode of planar form between the water emulsion interface and the two electrodes connected to the transformer secondary. A third electrode so positioned may have some advantage not offered by the interface as an electrode. In any event, such electrode would be grounded and function as a part of the system to produce the desired fields.

From the foregoing, it will be seen that this invention is one well adapted to attain all of the ends and objects hereinabove set forth, together with other advantages which are obvious and inherent to the method and apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. A process for coalescing water which is dispersed in the form of droplets throughout a second liquid, including, passing a mixture of a liquid and water droplets dispersed throughout the liquid through an electrostatic field, generating the electrostatic field with two sources of D.C. voltages, each source being periodically applied to one of two spaced electrodes, forming a body of water droplets coalesced by the electrostatic field and gravitated below the electrodes, withdrawing water from the body while maintaining a predetermined level for the body below the electrodes, connecting the body to the reference common to the two sources, and withdrawing from the field the liquid from which the water droplets are gravitated.

2. A process for coalescing water which is dispersed in the form of droplets throughout a second liquid comprising the steps of using two of three electrodes periodically energized from two sources of D.C. voltages of opposite polarity and:

a. generating a first electrostatic field which exerts a force first in one direction and then in a different direction, b. generating a second electrostatic field which exerts a force in one direction and which varies in magnitude, c. and passing a mixture of said water droplets and the second liquid into the first electrostatic field and then into the second electrostatic field whereby the water droplets are coalesced in the electrostatic fields and gravitated from the second liquid.

3. A process for coalescing water which is dispersed in the form of droplets throughout a second liquid comprising the steps of:

a. providing at least one pair of electrodes immersed in a mixture of said water droplets and the second liquid, b. providing a single electrode below the pair of electrodes and connected to the reference common to the pair of electrodes, c. periodically charging each of the electrodes of the pair with D.C. charges of opposite polarity whereby a pulsating unidirectional electrostatic field is formed between the electrodes, d. and passing the mixture of the water droplets and the second liquid into the electrostatic field whereby the water droplets are coalesced and gravitated from the second liquid.

4. A process for coalescing water which is dispersed in the form of droplets throughout a second liquid, including, passing a mixture of a liquid and water droplets dispersed throughout the liquid through at least two electrostatic fields, generating the electrostatic fields with two D.C. voltages periodically applied to two electrodes of an electrode system of at least three spaced electrodes, the third electrode connected to the reference common to the two electrodes, forming a body of water droplets coalesced by the electrostatic fields and gravitated below the fields, and withdrawing water from the body to maintain a predetermined level for the interface below the fields, and withdrawing from the fields the liquid from which the water droplets are gravitated.

5. A process for coalescing water which is dispersed in the form of droplets throughout a second liquid, including, passing a mixture of a liquid and water droplets dispersed throughout the liquid through an electrostatic field, periodically applying a first of two sources of D.C. voltage having opposite polarity to a first of two spaced electrodes and periodically applying a second of the two sources to a second of the two spaced electrodes to generate an electrostatic field, forming a body of water droplets coalesced by the electrostatic field and gravitated below the electrodes, withdrawing water from the body while maintaining a predetermined level for the body below the electrodes, connecting the body to the reference common to the two sources, and withdrawing from the field the liquid from which the water droplets are gravitated.

* * * * *